E. R. JOHNSON.

TALKING MACHINE.

APPLICATION FILED MAR. 3, 1908.

Reissued Jan. 4, 1910. 13,069.

INVENTOR

Eldridge R. Johnson

WITNESSES

F. J. Hartman.

Lucy Cobb Kennedy.

BY Horace Pettit.

ATTORNEY.

UNITED STATES PATENT OFFICE.

ELDRIDGE R. JOHNSON, OF MERION, PENNSYLVANIA, ASSIGNOR TO VICTOR TALKING MACHINE COMPANY, A CORPORATION OF NEW JERSEY.

TALKING-MACHINE.

13,069. Specification of Reissued Letters Patent. Reissued Jan. 4, 1910.

Original No. 856,704, dated June 11, 1907, Serial No. 235,921. Application for reissue filed March 3, 1908. Serial No. 419,057.

*To all whom it may concern:*

Be it known that I, ELDRIDGE R. JOHNSON, a citizen of the United States, and a resident of Merion, county of Montgomery, State of Pennsylvania, have invented certain new and useful Improvements in Talking-Machines, of which the following is a full, clear, and complete disclosure.

My invention relates to the art of recording and reproducing sounds, and has for its object, among others, to provide improvements in apparatus for reproducing sounds from a record of the same, by means of which the quality and naturalness of the recorded sounds are reproduced with greater faithfulness, and also with a reduction of the commingled extraneous sounds, which are usually present, and which appear to be made by the operation of the reproducing apparatus, for instance, among others, the scratching usually produced by the contact of the reproducing stylus and record when reproducing, and other sounds given out by parts of the apparatus when in operation, among which may be mentioned, the sounds that might be made by the motor when operating.

Among the other objects of my invention is to provide apparatus for imparting resonance to the reproduced sounds; to modify such sounds after amplification; to deflect the sounds after amplification; to protect and conceal the operative parts of the apparatus, to improve the appearance of the talking machine as a whole, so as to provide an ornamental piece of furniture, and to provide, in connection with the cabinet of such a talking machine, convenient means for the storage of records, needles and other accessories.

In the accompanying drawings is illustrated one form of apparatus containing my improvements, by means of which the foregoing objects are attained, and by which is accomplished the new results, all of which will hereinafter be fully described and claimed, and which form a part of this specification, and in which—

Figure 1:
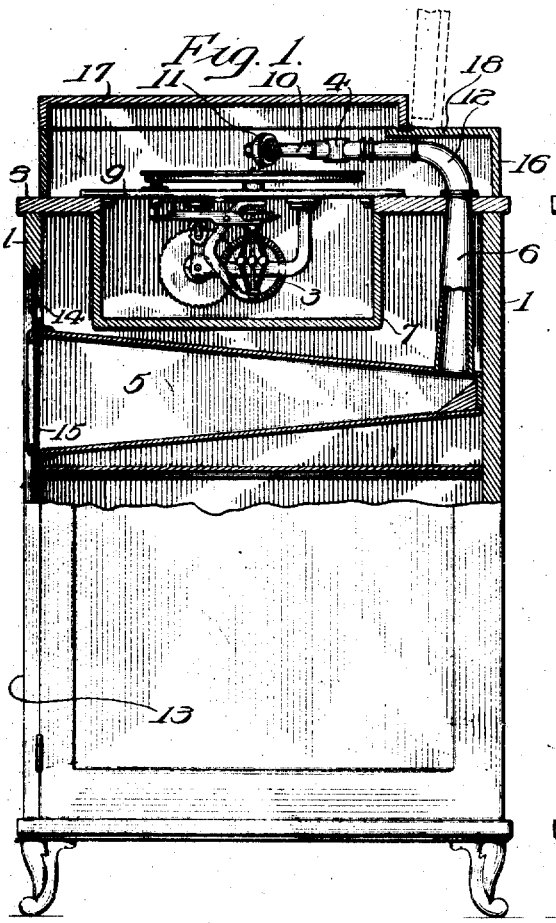
Figure 2:
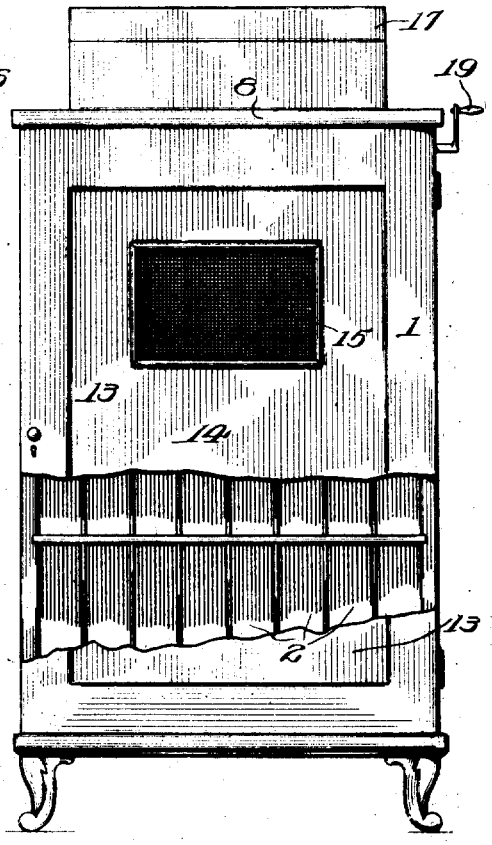
Figure 3:
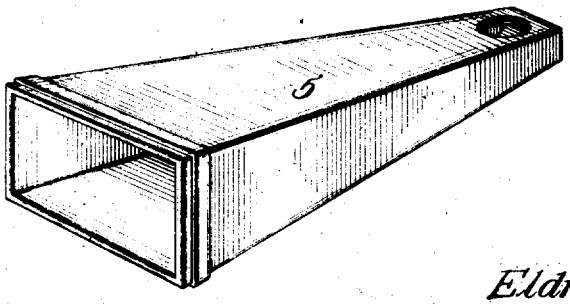

Figure 1 represents one form of my improved talking machine and cabinet therefor, shown in section at its upper portion; Fig. 2 is a front elevation thereof showing the lower portion of the front of the casing broken away, and Fig. 3 is a detail perspective view of the sound amplifying portion of the sound conducting tube.

Referring to the drawings, the numeral 1 indicates a rectangular cabinet or casing, the lower portion of which is preferably divided into a number of compartments 2, each of which is of such size and shape as to receive a plurality of records either singly or in the form of portfolios or volumes containing a number of records. The upper portion of the cabinet 1 contains the talking machine motor 3, the reproducing mechanism 4 and the flattened amplifying portion 5 of the sound conducting tube 6. The casing 7 for the motor 3 is preferably suspended from the top 8 of the cabinet 1 and the base plate 9 of the motor 3 preferably rests upon said top 8. The reproducing mechanism 4 which comprises a pivoted hollow arm 10 having a sound box 11 attached to the outer end thereof is supported by the top 8 and instead of curving upwardly, as in the usual form of talking machines, curves downwardly as indicated at 12 and connects with the vertical sound conveying tube 6. Beneath the motor casing 7 and extending from the back to the front of the cabinet 1 is the tapering amplifying portion of the sound conducting tube and the smaller end thereof is connected with the vertical sound conveying tube 6 in any suitable manner. The front side of the cabinet is provided with an opening which is closed by a door 13 which gives access to that portion of the form of cabinet 1, shown in the drawing, in which is contained the amplifier 5. The said door 13 is hinged and provided with a panel 14 in which there may be, if desired, an opening covered by a fine mesh netting or screen 15. The rigid and inflexible door 13 of the cabinet may be swung on its hinges to partly or fully open or close the outer end of the amplifying portion of the sound conveying tube, and the air chamber surrounding the said amplifying portion. When partly opened the sounds issuing from the amplifying horn, or surrounding air chamber, or both, will be deflected and the character and volume of the reproduced sounds will be modified by swinging the door to different positions. The door may also allow of access to the compartments 2.

The top portion of the cabinet or casing 1 is preferably formed into a top compartment, which has a pivoted cover 17 hinged to a fixed horizontal portion 18 of the form of compartment 16, shown in the said drawings. This pivoted cover is of sufficient size to allow free access to the turntable and reproducing mechanism, and at the same time allows the fixed portion 18 of the top compartment 16 to form an additional support for the reproducing mechanism. The winding shaft of the motor preferably extends through the outer portion of the casing 1 and terminates in the winding crank 9.

One of the objects of my invention, namely, the improvement in the quality and naturalness of the reproduction, and which is accomplished in my apparatus is due to the inclosing of the stationarily mounted amplifier 5, and not dependent upon the means for modifying or deflecting the sound, nor for preventing the scratching from commingling with the reproduced sound, that is to say, I have found in practice that so inclosing the amplifier does improve the quality and naturalness of the reproduced sound, and having secured such new result I desire to claim broadly, an apparatus embodying such means. I have also found that when there is an air space between the amplifying means and its inclosing casing, improved results appear to be attained, and still more so when this air space between the amplifying means and its casing may be opened to the atmosphere, so that sounds therein may commingle with the sounds emanating from the interior of the amplifier. This last result, of course, is accomplished when the door or closure is open, as is manifest. This part of my invention rests for its novelty upon the new results which are accomplished thereby, namely,—(1) the inclosing of the amplifier; (2) the formation of the air space around said amplifier; and (3) the opening of said air space as described, as hereinafter claimed, and are three different subdivisions of this part of my invention, and, as before stated, are independent of the means for modifying and deflecting the sounds after amplification, or the means by which the commingling of the scratching and the amplified sounds is reduced. I have also found that such amplifier 5 so arranged acts as a resonator, or, in other words, it provides a combined amplifier and resonator, by which resonance is imparted to the amplified sounds which, of course, is an advantage and a new result, but my broad invention of employing an inclosed resonator, or an inclosed combined amplifier and resonator is not limited to the cross sectional shape thereof. I do not, however, claim to be the inventor of the particular shape of amplifier shown in the drawings of my application, for I believe that the flattened amplifier or an amplifier oblong in cross section, or an amplifier the major portion of which has cross sectional axes of substantially different length, to be the invention of another, and I expressly disclaim the same.

In addition to the results I have just described, there is, of course, the modification and deflection of the reproduced sounds after amplification, which is accomplished by a closure or swinging door 13 as described, although it will be understood that such a sound deflector and modifier could be arranged in various other shapes.

It is obvious that by inclosing the reproducing apparatus within the upper compartment 16, I am enabled to reduce the amount of scratching which commingles with the sounds emanating from the combined amplifier and resonator, and also the sounds that emanate from the outside of the diaphragm, which would otherwise commingle with the amplified sound to which resonance has been imparted, are reduced.

If preferred, the motor or operating means 3 can be inclosed within the casing 7, and when so inclosed said casing serves to confine, to a great extent, therein, any noises which might be caused by the motor when in operation.

In addition to the improvement in the quality and naturalness of the reproduction by inclosing the amplifier, it is manifest, of course, that the appearance of the complete apparatus is made much more pleasing, and permits a greater latitude in improving the appearance of the device, while the advantage of having a storage place for records as a part of the apparatus itself, is obvious.

For the purpose of preventing extraneous forces from interfering with the vibration of the amplifier walls, or, in other words, preventing extraneous vibration of the amplifier and detracting from the purity of the tone reproduced, means are provided for embracing the major portion, or one of the sections, of the amplifier, and this means may vary within wide limits. In the best constructions, however, this embracing means will consist of an inclosure in which the major portion of the amplifier is located. The inclosure may be variously located. In the best constructions, however, it will be so located as to embrace the major portion of the amplifier in a position below the record and talking machine. The amplifier may be variously located within the inclosure, but in the best constructions it will be substantially horizontally positioned, and the inclosure itself will serve as a rigid support for the major portion of the amplifier. The inclosure being stationary and the major portion of the amplifier being rigidly supported by the inclosure, it follows that the major portion of the amplifier is supported in a fixed position within the inclosure, and below the record and talking machine. In the best constructions, the inclosure is formed by the walls and partitions of the cabinet inclosing the entire apparatus.

For the purpose of preventing extraneous noises from detracting from the purity of the tone reproduced, means are provided for isolating extraneous noise from the sounds or tones issuing from the amplifier. As hereinbefore explained, the noise produced by the operating mechanism of the talking machine is isolated by its inclosure in a compartment. Other noises detrimental to the purity of the reproduced tone are, however, found in machines heretofore constructed. Means are provided, therefore, for isloating the noise produced by the contact of the reproducer stylus with the record from that issuing from the amplifier, and this means may vary within wide limits. In the best constructions, this means consists in a compartment in which the record and reproducer are located.

It is understood, of course, that my invention is not confined to the particular form of apparatus herein shown and described, and, therefore, I claim broadly the right to employ all equivalent instrumentalities coming within the scope of the claims, and by means of which the objects of my invention are attained, and the new results accomplished, as herein set forth, as it is obvious that the particular embodiment herein shown and described is only one of many that can be employed to attain these objects and accomplish these results.

Having thus described my invention, what I claim as new and desire to protect by Letters Patent of the United States is:

1. In a talking machine, the combination with sound reproducing means, of an amplifier connected therewith, an inclosure provided with a lateral opening and supporting the major portion of said amplifier in a fixed position, the delivery end of said amplifier being adjacent said opening, and an inflexible door operating in front of the delivery end of said amplifier.

2. In a talking machine, the combination with sound reproducing means, of an amplifier connected therewith, an inclosure provided with a lateral opening and supporting the major portion of said amplifier in a fixed position, the delivery end of said amplifier being adjacent said opening, and a rigid and adjustable closure for said opening.

3. In a talking machine, the combination with sound reproducing means, of an amplifier connected therewith, an inclosure provided with a lateral opening and supporting the major portion of said amplifier in a fixed position, the delivery end of said amplifier being adjacent said opening, and a pivoted door operating in front of the delivery end of said amplifier.

4. A sound reproducing means comprising a main casing provided with a lateral opening, a sound reproducer within said casing, a motor compartment within said main casing, a motor in said compartment, an amplifier, a sound conveyer connected with said reproducer and with said amplifier, a hinged door arranged to open and close said opening in said main casing and located in front of said amplifier.

5. A sound reproducing machine comprising a sound reproducer inclosed within a main casing, an inner motor casing, a motor within said casing, an amplifying horn beneath said casing, a sound conveyer connecting said reproducer with said amplifying horn, an inflexible and adjustable closure in the front of the main casing and in front of the mouth of said horn.

6. A sound reproducing machine comprising a main casing provided with a lateral opening, a removable cover upon said main casing, a sound reproducer within said main casing, a motor compartment within said main casing, a motor within said compartment, an amplifying horn, a sound conveyer connecting said reproducer with said sound amplifying horn, a hinged door arranged to open and close said opening in said main casing in front of said amplifying horn.

7. A sound reproducing machine comprising a main casing, a sound reproducer within said casing, a motor, an amplifying horn and a sound conveyer connecting said reproducer with said amplifying horn all within said casing, a rigid door for said main casing in a side thereof and in front of said amplifying horn to modify the reproduced sound.

8. The combination with a talking machine and an amplifying horn connected thereto, of a casing completely inclosing said talking machine and horn, and a rigid swinging door in said casing located adjacent the mouth of said horn.

9. A sound reproducing machine comprising a main casing, a reproducer inclosed within said main casing, a motor within said main casing, an amplifying horn in said casing, a sound conveyer connecting said reproducer with said amplifying horn, a rigid and adjustable closure in the front of the main casing and in front of the mouth of said horn.

10. In a talking machine, an amplifying horn, a mesh, netting or screen extending transversely across the same and adjustable with respect thereto.

11. In a talking machine, an amplifying horn, and an adjustable mesh, netting or screen extending transversely of the mouth of said horn.

12. In a talking machine, an amplifying horn, and a mesh, netting or screen extending transversely of the mouth thereof and mounted to swing toward and away from said mouth.

13. In a talking machine, a casing, a tubular arm secured to said casing, a movable tone arm mounted upon, communicating with and wholly supported by one end of said tubular arm, and an amplifier within said casing communicating with the other end of said tubular arm.

14. In a talking machine, the combination with sound reproducing means, of a stationary amplifier coöperatively connected therewith, an inclosure embracing the major portion of the amplifier, a divided cabinet inclosing the talking machine and provided with a series of partitions forming compartments for the storage of records and a door to open and close the mouth of the amplifier and to give access to said compartments.

15. In a sound reproducing machine, a main casing, a sound reproducer inclosed within said casing, a motor within said casing an amplifying horn beneath said motor, a series of small compartments below said horn, a sound conveyer connecting said reproducer with said horn, and an adjustable closure for opening and closing the mouth of said amplifier and for giving access to said compartments.

In witness whereof I have hereunto set my hand this twenty-fifth day of February, A. D. 1908.

ELDRIDGE R. JOHNSON.

Witnesses:
G. A. Guerra,
A. E. Griffith.